United States Patent
McGavin (10) Patent No.: US 8,959,830 B2
(45) Date of Patent: Feb. 24, 2015

(54) FLYING INSECT TRAP

(76) Inventor: Elisabeth McGavin, Whitefish, MT (US)

( * ) Notice: Subject to any disclaimer, the term of this patent is extended or adjusted under 35 U.S.C. 154(b) by 412 days.

(21) Appl. No.: 13/402,601

(22) Filed: Feb. 22, 2012

(65) Prior Publication Data

US 2013/0212926 A1    Aug. 22, 2013

(51) Int. Cl.
*A01M 1/10* (2006.01)
*A01M 1/24* (2006.01)
*A01M 1/02* (2006.01)

(52) U.S. Cl.
USPC ............................... 43/122; 43/107; 43/119

(58) Field of Classification Search
CPC ........... A01M 1/00; A01M 1/06; A01M 1/02; A01M 1/24
USPC ............................ 43/122, 119, 107
See application file for complete search history.

(56) References Cited

U.S. PATENT DOCUMENTS

| | | | | |
|---|---|---|---|---|
| 15,752 A * | 9/1856 | Arnold | ............... | 43/110 |
| 127,297 A * | 5/1872 | Beach | ............... | 43/122 |
| 263,222 A * | 8/1882 | Reynolds | ............... | 43/107 |
| 404,565 A * | 6/1889 | Schuyler | ............... | 43/118 |
| 544,831 A | 8/1895 | Schmittle | | |
| 601,953 A * | 4/1898 | Engelbrecht | ............... | 43/118 |
| 804,654 A | 11/1905 | Gibson | | |
| 805,015 A * | 11/1905 | Hazelrigg | ............... | 43/119 |
| 992,158 A * | 5/1911 | Carpenter | ............... | 43/118 |
| 1,026,222 A * | 5/1912 | Rigsby et al. | ............... | 43/118 |
| 1,053,251 A * | 2/1913 | Verzani | ............... | 43/119 |
| 1,072,342 A * | 9/1913 | Louviere | ............... | 43/107 |
| 1,072,374 A * | 9/1913 | Acree | ............... | 43/119 |
| 1,073,811 A * | 9/1913 | Miller | ............... | 43/119 |
| 1,091,550 A * | 3/1914 | Walters | ............... | 43/122 |
| 1,107,091 A * | 8/1914 | Mielke | ............... | 43/122 |
| 1,190,117 A * | 7/1916 | Cooley | ............... | 43/118 |
| 1,200,993 A * | 10/1916 | Seasholtz | ............... | 43/119 |
| 1,271,355 A * | 7/1918 | Olejniczak | ............... | 43/122 |
| 1,286,567 A * | 12/1918 | Evers | ............... | 43/119 |
| 1,297,894 A * | 3/1919 | Navrot | ............... | 43/122 |
| 1,308,439 A * | 7/1919 | Morisak | ............... | 43/122 |
| 1,338,113 A * | 4/1920 | Tibbetts | ............... | 43/119 |
| 1,340,779 A * | 5/1920 | Lee | ............... | 43/119 |
| 1,353,310 A * | 9/1920 | Bonnet | ............... | 43/122 |
| 1,358,150 A * | 11/1920 | Hasselgren | ............... | 43/119 |
| 1,366,059 A * | 1/1921 | Miller | ............... | 43/118 |
| 1,378,048 A * | 5/1921 | Maziarz | ............... | 43/122 |
| 1,448,098 A * | 3/1923 | Varga | ............... | 43/122 |
| 1,496,135 A * | 6/1924 | Schwiening | ............... | 43/118 |
| 1,606,568 A * | 11/1926 | Gross | ............... | 43/107 |
| 1,629,816 A * | 5/1927 | Carlson | ............... | 43/119 |
| 1,749,717 A * | 3/1930 | Palmos | ............... | 43/119 |
| 1,772,729 A * | 8/1930 | Pisani | ............... | 43/122 |
| 1,786,704 A * | 12/1930 | Deibele | ............... | 43/122 |

(Continued)

FOREIGN PATENT DOCUMENTS

| | | | | |
|---|---|---|---|---|
| DE | 19505950 A1 * | 9/1995 | ............. | A01M 1/10 |
| JP | 02128639 A * | 5/1990 | ............. | A01M 1/10 |

(Continued)

*Primary Examiner* — Darren W Ark
(74) *Attorney, Agent, or Firm* — McHale & Slavin, P.A.

(57) ABSTRACT

The present invention relates to fly and insect traps and more particularly to a trap capable of suctionally engaging a substantially flat non-porous surface that selectively traps insects. The trap is preferably constructed from a top vessel member, a bottom vessel member and a hollow frustum providing point of entry about the bottom vessel member.

19 Claims, 7 Drawing Sheets

(56) References Cited

U.S. PATENT DOCUMENTS

| | | | | |
|---|---|---|---|---|
| 1,787,421 | A * | 12/1930 | Ruddell | 43/107 |
| 1,936,644 | A * | 11/1933 | Schroder | 43/118 |
| 2,350,519 | A * | 6/1944 | Olson | 43/119 |
| 2,478,104 | A * | 8/1949 | Johnson | 43/122 |
| 2,997,806 | A * | 8/1961 | Duvall | 43/121 |
| 4,217,723 | A * | 8/1980 | Hrebec | 43/122 |
| 4,244,135 | A * | 1/1981 | Harwoods | 43/122 |
| 4,551,941 | A * | 11/1985 | Schneidmiller | 43/122 |
| 4,607,451 | A | 8/1986 | Jarecki | |
| 4,738,049 | A * | 4/1988 | Baley | 43/122 |
| D297,556 | S | 9/1988 | Briseno | |
| 5,022,179 | A * | 6/1991 | Olson | 43/114 |
| 5,193,302 | A * | 3/1993 | Rusco et al. | 43/107 |
| 5,239,771 | A * | 8/1993 | Beardsley | 43/122 |
| 5,243,781 | A * | 9/1993 | Carter | 43/122 |
| 5,557,880 | A * | 9/1996 | Schneidmiller | 43/122 |
| 5,596,833 | A * | 1/1997 | Harrie et al. | 43/122 |
| 6,164,009 | A * | 12/2000 | Clarke | 43/122 |
| 6,463,693 | B1 * | 10/2002 | Weisner | 43/119 |
| 6,532,695 | B1 * | 3/2003 | Alvarado | 43/122 |
| 6,550,181 | B1 | 4/2003 | Ray | |
| 6,625,922 | B1 * | 9/2003 | Ernsberger, IV | 43/122 |
| 6,722,080 | B2 * | 4/2004 | Carter | 43/107 |
| 6,898,896 | B1 | 5/2005 | McBride et al. | |
| 7,380,369 | B1 * | 6/2008 | Greene et al. | 43/122 |
| 7,412,797 | B1 * | 8/2008 | Hiscox | 43/122 |
| 7,503,142 | B1 * | 3/2009 | Uhl | 43/122 |
| 7,748,159 | B1 * | 7/2010 | Wenner | 43/119 |
| 7,886,481 | B2 * | 2/2011 | Schneidmiller et al. | 43/122 |
| 8,051,600 | B2 * | 11/2011 | Schneidmiller | 43/122 |
| 8,056,282 | B2 * | 11/2011 | Schneidmiller | 43/122 |
| 8,371,063 | B2 * | 2/2013 | King | 43/112 |
| 8,418,399 | B2 * | 4/2013 | Palencia-Adrubau et al. | 43/122 |
| 8,813,419 | B2 * | 8/2014 | Schneidmiller et al. | 43/122 |
| 2005/0274060 | A1 * | 12/2005 | Lederle et al. | 43/119 |
| 2005/0279016 | A1 * | 12/2005 | Williams et al. | 43/122 |
| 2006/0137240 | A1 * | 6/2006 | Dismore | 43/107 |
| 2011/0283599 | A1 * | 11/2011 | Wu et al. | 43/122 |
| 2012/0266520 | A1 * | 10/2012 | Strube | 43/114 |

FOREIGN PATENT DOCUMENTS

| | | | | |
|---|---|---|---|---|
| JP | 2001054346 A * | 2/2001 | | A01M 1/10 |
| JP | 2011139693 A * | 7/2011 | | A01M 1/10 |
| JP | 2013063060 A * | 4/2013 | | A01M 1/10 |
| JP | 2013094143 A * | 5/2013 | | A01M 1/10 |
| WO | WO 0237958 A1 * | 5/2002 | | A01M 1/02 |
| WO | WO 03075651 A1 * | 9/2003 | | A01M 1/24 |
| WO | WO 2005048703 A1 * | 6/2005 | | A01M 1/24 |
| WO | WO 2010085843 A1 * | 8/2010 | | A01M 1/10 |

* cited by examiner

FLYING INSECT TRAP

FIELD OF THE INVENTION

The present invention relates to insect traps and more particularly to a trap capable of suctionally engaging a substantially flat non-porous surface that selectively traps flying insects.

BACKGROUND OF THE INVENTION

There are known insect traps constructed and arranged to allow insect entry into a chamber whereby the insects are unable to exit.

U.S. Pat. No. 601,953 discloses a fly-trap having in which flies are imprisoned by use of an inlet-funnel above a bait-receptacle. Flies entering the bait-receptacle through the funnel are captured.

U.S. Pat. No. 1,026,222 discloses a fly trap formed of reticulated material and provided with an entrance passageway by means of which flies may enter the trap and be prevented from escaping therefrom.

U.S. Pat. No. 4,244,135 discloses an improved insect trap having a tubular frusto conical member. The frusto conical member is open at each axial end and is removably secured to and contained within the housing so that the apex is vertically above the base of the frusto conical member. An annular capture chamber open only through the apex opening of the frusto conical portion is formed between the housing and the frusto conical member. A tray of insect bait is disposed beneath the base of the frusto conical member so that insects flying upwardly from the bait pass upwardly through the apex of the frusto conical member and into the capture chamber.

U.S. Pat. No. 4,551,941 discloses a transparent cylindrical insect trap having a bottom entry to a circular truncated entry cone that exits into a cylindrical entrapment chamber, configured to inhibit insect exit therefrom. The trap top provides a screened orifice to allow volatile attractant to move upwardly out of the entrapment chamber and entry orifices allow it to move downwardly therefrom.

U.S. Pat. No. 4,607,451 discloses a vacuum operated insect trap. The instrument is made up of a suction device adapted to be held in the hand of a person and connected to a funnel like adapter by means of a hollow wand. The user holds the instrument by its handle and holds the mouth of the applicator near the insect which is drawn into the applicator and hence into the suction device by said vacuum. A removable tank is attached to the instrument.

U.S. Pat. No. 4,738,049 discloses a fly trap comprised of a pair of upper and lower superimposed synthetic plastic trap sections defining an interior fly capturing chamber therebetween. The lower trap section has a centrally located upwardly dished fly collecting pocket with a fly admitting orifice in the dished pocket but disposed in spatial relation to the upper trap section.

U.S. Pat. No. 6,463,693 discloses an insect trap having a receptacle with a rear wall, the top edge of which is thin. The trap is placed on a windowsill so the thin top edge of the rear wall lies flush against the window, providing a substantially smooth transition between the rear wall and the window. The receptacle is partially filled with a mixture of water and surfactant. In use, insects flying down the window travel over the thin top edge of the rear wall and continue down and fall into the water and drown.

U.S. Pat. No. 7,886,481 discloses an insect trap having a transparent or translucent entrapment chamber with a closed upper end, an entry cone disposed therein, a base removably attachable to the entrapment chamber, and a lower container for holding a liquid attractant removably attachable to the base, such that evaporating attractant from the container enters the entrapment chamber. The base includes a plurality of entry apertures adapted to permit target insects to enter the trap.

Accordingly, there exists a need for an insect trap in the form of a plastic receptacle capable of suctionally engaging a substantially flat non-porous surface that selectively traps insects. The insect trap has a frustum point of entry about the trapping receptacle.

SUMMARY OF THE INVENTION

The present invention relates to a new and improved insect trap. More particularly, the insect trap construction is based upon a receptacle having a first half and a second half that snap together forming a trapping receptacle capable of being suctionally mounted against a window.

Accordingly, it is an objective of the instant invention to provide a hollow receptacle constructed and arranged to trappingly allow the entry of insects.

It is a further objective of the instant invention to provide a receptacle having a top half and a bottom half each half forming a vessel constructed and arranged to slidingly engage the other vessel.

It is yet another objective of the instant invention to provide a hollow frustum constructed and arranged on the second half of the receptacle that allows the entry of insects.

It is a still further objective of the invention to provide a receptacle having a flat back wall capable of securely abutting a window utilizing a suction member.

It is a further objective of the instant invention to provide a suction member capable of affixing to the top half of the receptacle, the suction member is capable of removably suctioning to a substantially flat non-porous surface.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

These and other details of the present invention will be described in connection with the accompanying drawings, which are furnished only by way of illustration and not in limitation of the invention, and in which drawings.

DETAILED DESCRIPTION OF THE INVENTION

The present invention relates to a preferred embodiment of a fly trap. While the present invention is susceptible of embodiment in various forms, there is shown in the drawings and will hereinafter be described as presently preferred, albeit not limiting, embodiment with the understanding that the present disclosure is to be considered an exemplification of the present invention and is not intended to limit to the specific embodiments illustrated.

As shown in the FIGS. 1-5, a fly trap receptacle 10 is formed from a top portion 14 and a bottom portion 16. The receptacle 10 may be transparent, translucent or opaque or some combination thereof. When the receptacle is transparent plastic allowing the device to be viewed and the quantity of insects trapped inside the receptacle to be viewed. In addition, a transparent receptacle provides a visual indication of a need to empty the trap because of an accumulation of any number of insects. Moreover, a transparent or translucent container provides a faster disposal rate as sun light results in temperatures that will quickly destroy a trapped insect.

It should be noted that the top portion 14 and the bottom portion 16 form a receptacle having a flat back wall 18 and 19 allowing for placement on a narrow shelf, such as against a window The top portion may include a suction member 12 affixed to the back wall 18. The suction member 12 is capable of engaging a substantially flat non-porous surface. Furthermore, the suction member 12 is capable of suspendingly supporting the receptacle 10 against a substantially flat non-porous surface of any planar arrangement, though the preferred embodiment particularly suited for a vertical arrangement.

The top portion 14 and the bottom portion 16 having rims 34 and 36, respectively. The top portion rim 34 constructed and arranged with projections 32 and 41 on the inside wall of the top portion rim 34, the projections extending from the rim 34 towards the inner space of the top portion 14. The bottom portion rim 36 constructed and arranged with cavities 30 and 43 capable of frictionally accepting projections 32 and 41, respectively. Furthermore, the projections 32 and 41 and the cavities 30 and 43 suspendingly support the bottom portion 16 against the top portion 14 forming the receptacle 10. The top portion rim 34 slidingly engages over and on top of the bottom portion rim 36. The top portion and the bottom portion together forming a trapping receptacle capable of being suctionally mounted against a window.

The receptacle may be emptied and cleaned of the receptacle contents by removing the bottom portion from the top portion. During the emptying and cleaning, the top portion may remain suctionally engaged against the substantially flat non-porous surface.

Figure 1:
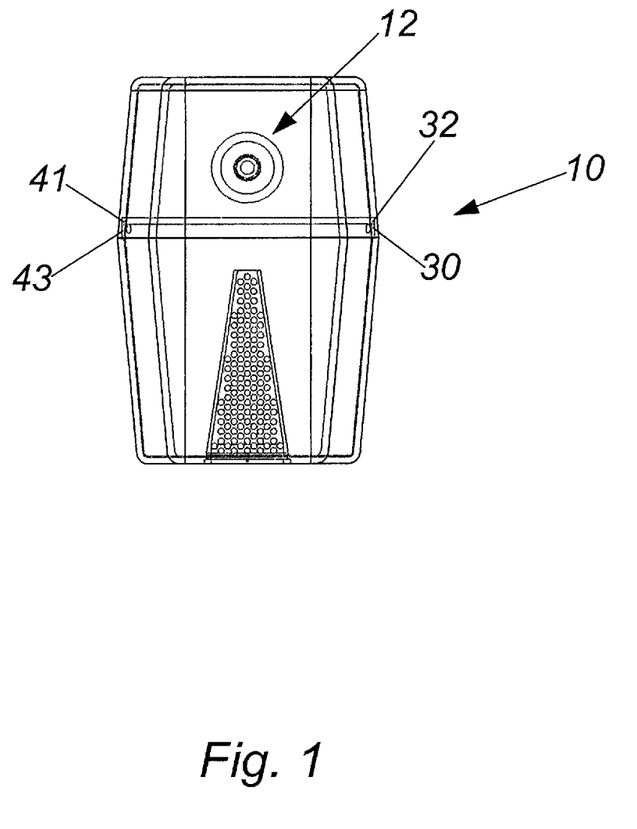
FIG. 1 is a front pictorial view of a fly trap.
Figure 2:
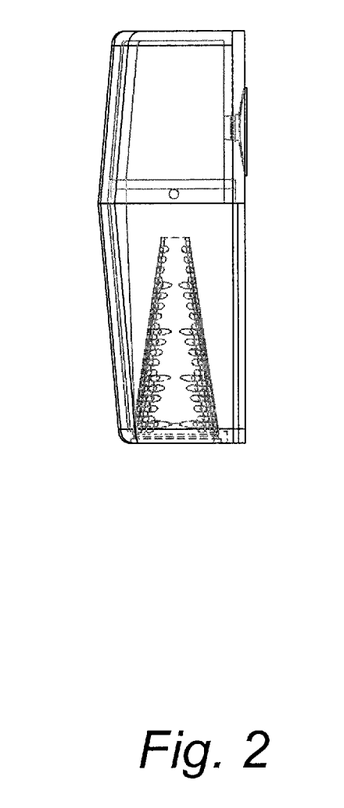
FIG. 2 is a side view of a fly trap.
Figure 3:
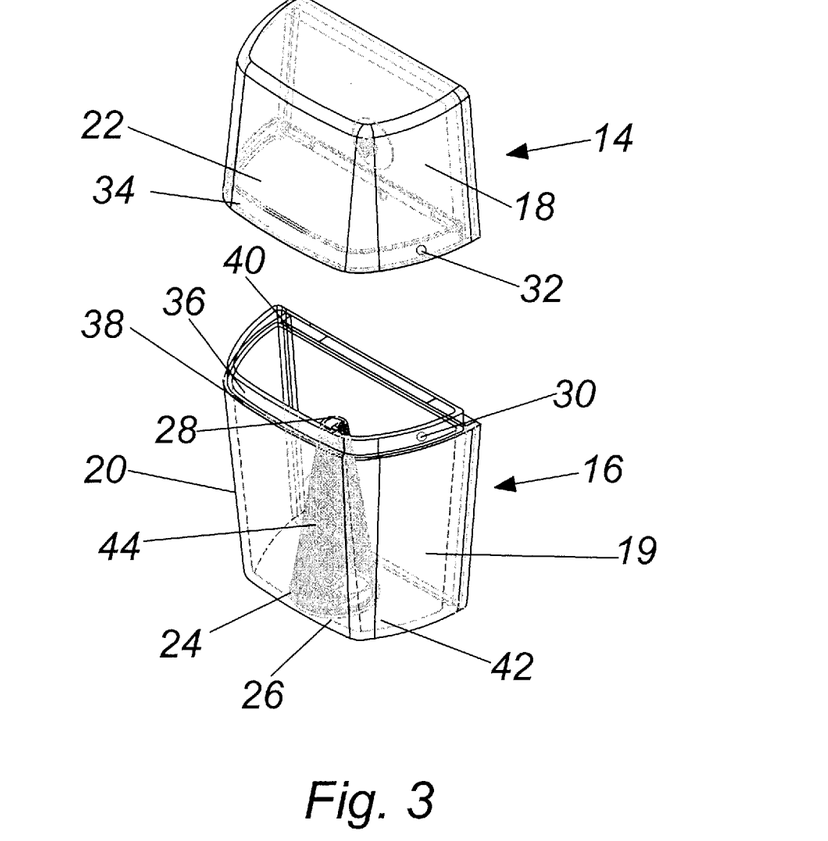
FIG. 3 is an exploded view of a fly trap.

As shown in the FIGS. 1-3, the bottom portion having a hollow frustum shaped member 24 constructed and arranged for allowing insect entry into the trapping chamber. Furthermore, the hollow frustum shaped member is the only point of entry about the receptacle when the top portion and the bottom portion are slidingly engaged about the top and bottom portion rims 34 and 36. The frustum 24 having a wide end 26 and a narrow end 28. The wide end 26 forming the point of entry into the receptacle 10 being disposed about the base 42 of the bottom portion 16 of the receptacle 10. The frustum 24 extending vertically from the wide end 26 to the narrow end 28 within the body of the receptacle. The body of the hallow frustum 24 may preferably be constructed with a plurality of holes 44 about the length and circumference of the hollow frustum 24. Additionally, the plurality of holes 44 are sized such that insects are incapable of passing therethrough.

Figure 4:
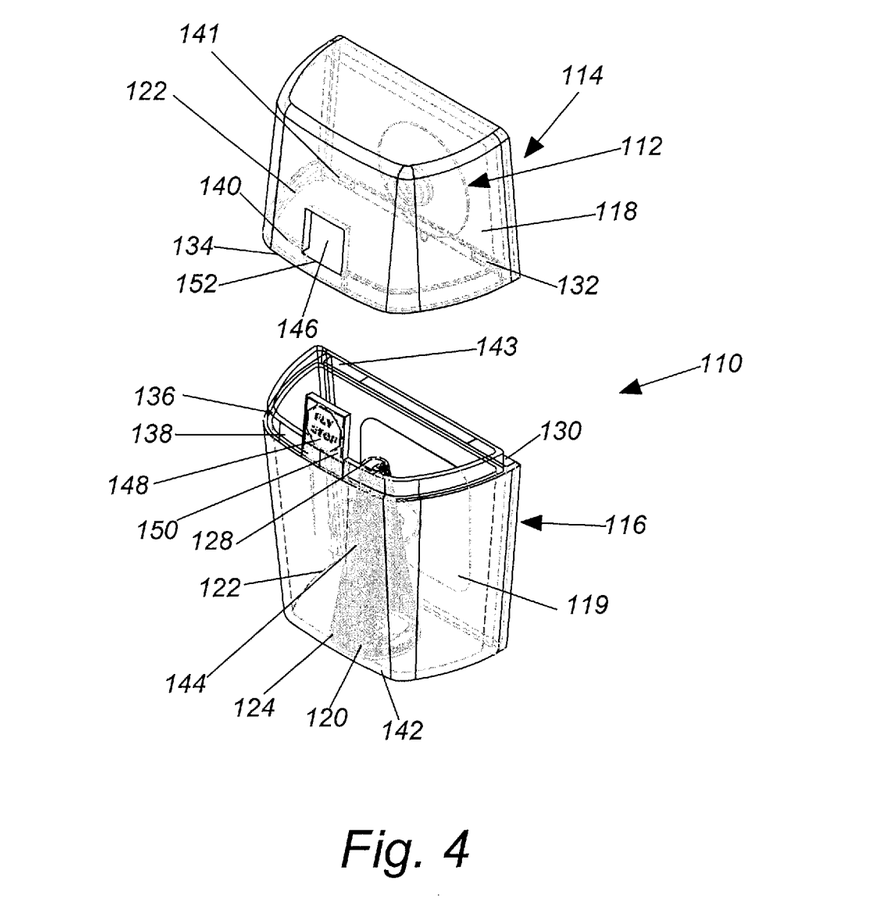
FIG. 4 is an exploded view of a fly trap.

Now referring to FIG. 4, a fly trap receptacle 110 is formed from a top portion 114 and a bottom portion 116. In one example, the receptacle 110 is formed of transparent plastic allowing the operation of the device to be viewed, and the quantity of insects trapped inside the receptacle to be viewed. In addition, a transparent receptacle provides a visual indication of a need to empty the trap because of an accumulation of any number of insects. Moreover, a transparent or translucent container provides a faster disposal rate as sun light results in temperatures that will quickly destroy a trapped insect.

It should be noted that the top portion 114 and the bottom portion 116 form a receptacle having a flat back wall 118 and 119 allowing for placement on a narrow shelf, such as against a window The top portion may include a suction member 112 affixed to the back wall 118. The suction member 112 is capable of engaging a substantially flat non-porous surface. Furthermore, the suction member 112 is capable of suspendingly supporting the receptacle 110 against a substantially flat non-porous surface of any planar arrangement, though the preferred embodiment particularly suited for a vertical arrangement.

The top portion 114 and the bottom portion 116 having rims 134 and 136, respectively. The bottom portion rim 136 constructed and arranged with projections 130 and 143 on the outside wall of the bottom portion rim 136, the projections extending outward from the rim 136 of the bottom portion 116. The top portion rim 134 constructed and arranged with cavities 132 and 141 capable of frictionally accepting projections 130 and 143, respectively.

The bottom portion 116 additionally includes a locking tab 148 that is capable of engaging a top portion cavity 146. The tab extends upward from the bottom portion rim 136. Additionally, the tab protrudes outward forming a downward facing side edge wall 150. When the locking tab 148 is engaged with the top portion cavity 146, the side edge wall 150 rests against the bottom edge 152 of the cavity 146, preventing the separation of the bottom portion 116 connected to the top portion 114. The tab may be semi-rigid to allow inward depression resulting from force exerted on the tab by a user. The inward depression by a user shall disengage the side edge wall 150 from the bottom edge 152 cavity 146 thereby permitting the top portion 114 and the bottom portion 116 to slidingly separate.

Furthermore, the projections 130 and 143 and the cavities 132 and 141 suspendingly support the bottom portion 116 against the top portion 114 forming the receptacle 110. The top portion rim 134 slidingly engages over and on top of the bottom portion rim 136. The top portion and the bottom portion together forming a trapping receptacle capable of being suctionally mounted against a window.

The receptacle may be emptied and cleaned of the receptacle contents by removing the bottom portion from the top portion. During the emptying and cleaning, the top portion may remain suctionally engaged against the substantially flat non-porous surface.

As shown in the Figures, the bottom portion having a hollow frustum shaped member 124 constructed and arranged for allowing insect entry into the trapping chamber. Furthermore, the hollow frustum shaped member is the only point of entry about the receptacle when the top portion and the bottom portion are slidingly engaged about the top and bottom portion rims 134 and 136. The frustum 124 having a wide end 126 and a narrow end 128. The wide end 126 forming the point of entry into the receptacle 110 being disposed about the base 142 of the bottom portion 116 of the receptacle 110. The frustum 124 extending vertically from the wide end 126 to the narrow end 128 within the body of the receptacle. The body of the hallow frustum 124 may preferably be constructed with a plurality of holes 144 about the length and circumference of the hollow frustum 124. Additionally, the plurality of holes 144 are sized such that insects are incapable of passing therethrough.

Figure 5:
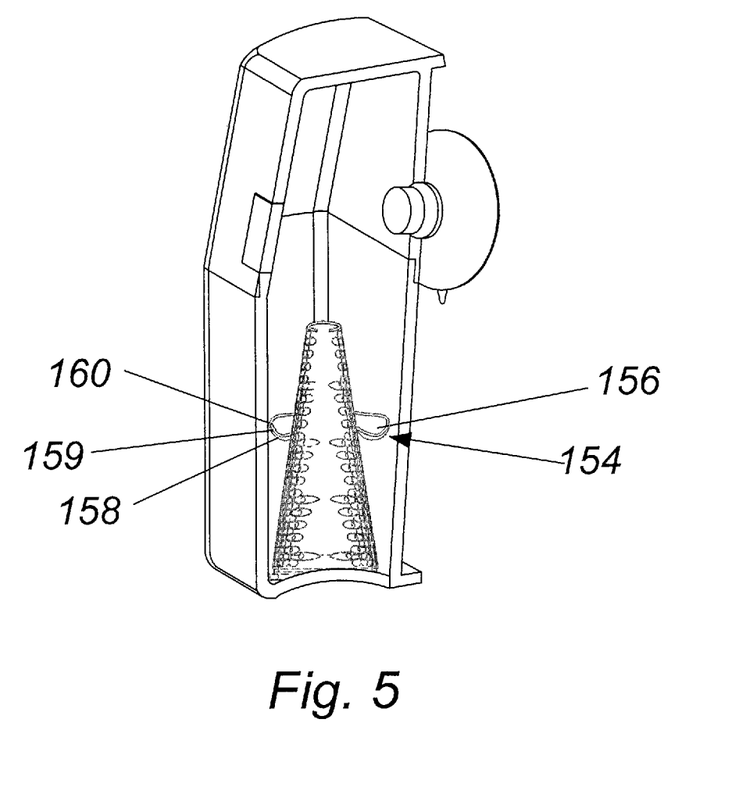
FIG. 5 is a cross-sectional view of a fly trap with a fragrance ring.

As shown in FIG. 5, a ring 154 removably abuts the outer surface of the hollow frustum shaped member. The ring includes a concave top surface 156 and a convex bottom surface 158. Additionally, the ring includes an outer edge 159 and an inner edge 160. The convex bottom surface 158 is constructed and arranged to frictionally engage against the widening of the hollow frustum. The top surface is constructed and arranged to hold fragrance for deodorizing the area proximate to the trap. In a second configuration, the top surface may hold an insect poison.

Figure 6:
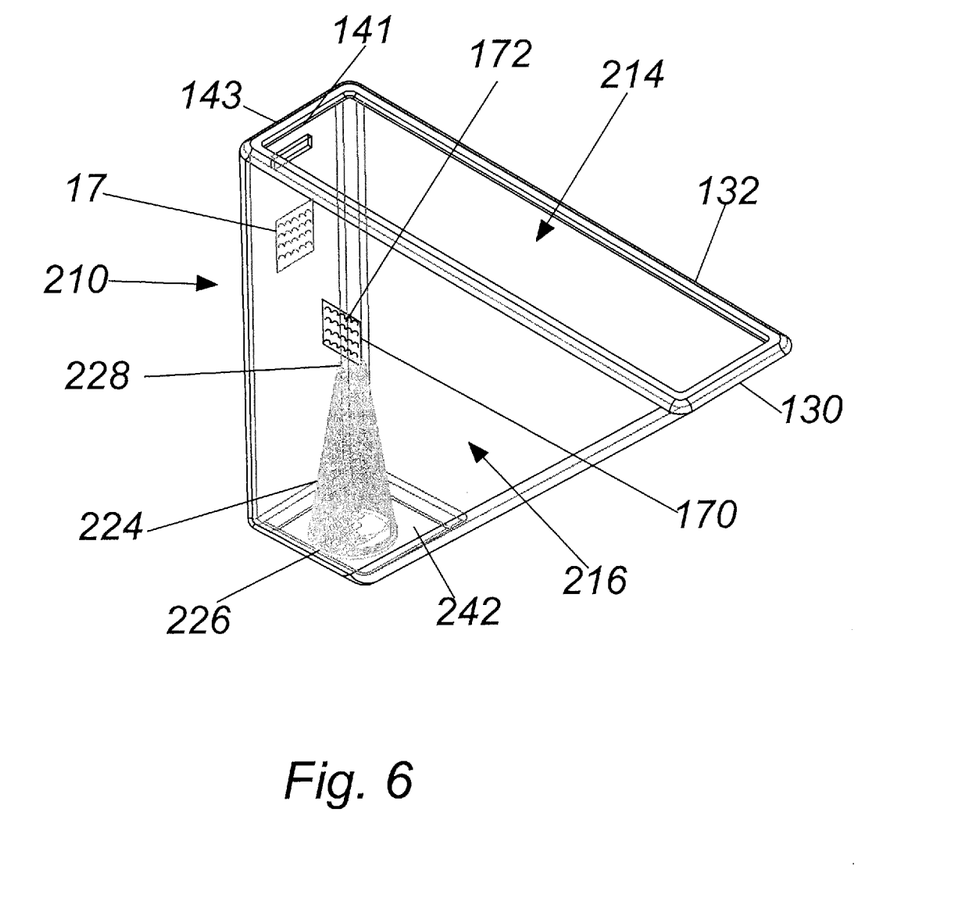
FIG. 6 is a front perspective view of a fly trap.
Figure 7:
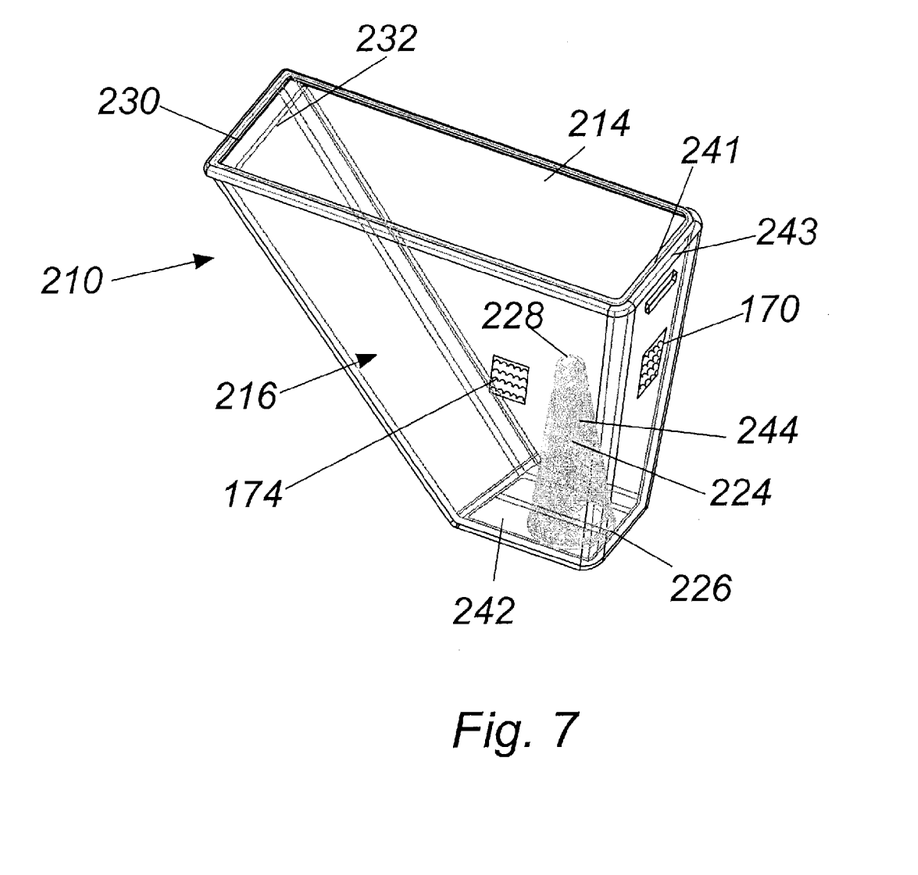
FIG. 7 is a rear perspective view of a fly trap.

As shown in FIGS. 6 and 7, the bottom portion having a hollow frustum shaped member 224 constructed and arranged for allowing insect entry into the trapping chamber. Furthermore, the hollow frustum shaped member 224 is the only point of entry about receptacle 210. A top portion 214 permanently secured to a bottom portion 216 creating an impervious connection therebetween. The top portion having locking members 232 and 241 permanently affix to locking members 230 and 242, respectively. Top portion 214 and bottom portion 216 secure to create receptacle 210 having one opening.

The frustum 224 having a wide end 226 and a narrow end 228. The wide end 226 forming the point of entry into the receptacle 210 being disposed about the base 242 of the bottom portion 216 of the receptacle 210. The frustum 224 extending vertically from the wide end 226 to the narrow end 228 within the body of the receptacle. The body of the hallow frustum 224 may preferably be constructed with a plurality of holes 244 about the length and circumference of the hollow frustum 224. Additionally, the plurality of holes 244 are sized such that insects are incapable of passing therethrough.

The outer facing wall of the receptacle 210 includes a securement member 170 having outer facing front side 174 and an inward facing back side 172. In one aspect of the invention, securement member 170 may be double sided tape being sticky on the front side 174 and on the back side 172. In a further aspect of the invention, securement member 170 may include sticky tape on the back side 172 and include hook and look fastening material on the front side 174. When the securement member 170 is hook and look fastening material on the front side 174, the front side 174 shall removably secure to a reciprocating member (not shown) having a reciprocating hook and loop front side and an opposing back side that includes a tacky surface or other adhesive material for securing against a window or other similar surfaces. Alternatively, the opposing back side could be a suctioning material for suctionally securing against a window or other similar structures. The securement member 170 provides a means for easily removing the receptacle 210 from a window or other similar surface. Easy removal of the receptacle 210 is particularly useful when the trap is made of disposable materials. Receptacle 210 and the hollow frustum 224 may be formed from plastic. The plastic may be opaque, transparent or translucent or some combination thereof. Alternatively, receptacle 210 and hollow frustum 224 may be formed from paper material, such as card board or other paper stock.

Additionally, the receptacle 210 and hollow frustum 224 may be formed of recyclable materials. Receptacle 210 and hollow frustum 224 may be formed of biodegradable materials.

It is further contemplated that, shown in the non-limitative embodiment in FIGS. 6 and 7, receptacle 210 that is further adapted to be disposed of with the trapped contents therein, the contents which may include flies and other insects. In practice, when front side 174 secures to reciprocating member (not shown), the receptacle 210 including the securement member 170 may be unsecured from the reciprocating member (not shown) and a new receptacle 210 may replace the old receptacle. In this way, the window shall receive a new receptacle for trapping flies and other insects.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An insect trap comprising:
    a top member forming a vessel constructed of plastic, said top member vessel comprising a flat top and a flat back wall;
    a top-member rim formed about an opening of said top member vessel;
    a bottom member forming a vessel constructed of plastic, said bottom member vessel comprising a flat base and a flat back wall;
    a bottom-member rim formed about an opening of said bottom member vessel;
    a hollow frustum having a wide-end opening and a narrow-end opening, said frustum permitting free passage therethrough;
    a suction member having a first end and a second end, said suction member capable of suctionally engaging a substantially flat non-porous surface of any planar arrangement on said first end, said suction member capable of affixing to said flat back wall of said top member vessel on said second end; and
    wherein said wide-end opening of said frustum affixingly constructed and centrally arranged on said flat base of said bottom member vessel, said frustum extending from said flat base of said bottom member vessel towards the opening of said bottom member vessel.

2. The insect trap according to claim 1 wherein said plastic of said top member vessel being one of transparent, translucent and opaque, and wherein said plastic of said bottom member vessel being one of transparent, translucent and opaque.

3. The insect trap according to claim 2 wherein said hollow frustum is formed from plastic, said plastic being one of transparent, translucent and opaque.

4. The insect trap according to claim 1 wherein said suction member is capable of remaining suctionally engaged to said substantially flat non-porous surface after removal of the bottom member vessel from said top member vessel.

5. The insect trap according to claim 1 wherein said suction member suctionally engages a vertically arranged surface.

6. The insect trap according to claim 1 wherein said hollow frustum having a plurality of holes along a length and about a circumference of said frustum.

7. The insect trap according to claim 1 wherein said top-member rim urgingly slides over and around said bottom-member rim.

8. The insect trap according to claim 6 wherein said plurality of holes are sized to discourage insect passage therethrough.

9. The insect trap according to claim 1 wherein said top-member rim formed about the opening of said top member vessel including a first projection and a second projection on said top-member rim; wherein said bottom-member rim formed about the opening of said bottom member vessel including a first cavity and a second cavity on said bottom-member rim; and wherein said first projection and said second projection frictionally engage said first cavity and said second cavity, respectively.

10. The insect trap according to claim 1 wherein said top member vessel is opaque, wherein said bottom member vessel is opaque, and wherein said hollow frustum is opaque.

11. An insect trap comprising:
a top member forming a vessel constructed of plastic, said top member comprising a flat top and a flat back wall;
a top-member rim formed about an opening of said top member vessel;
a bottom member forming a vessel constructed of plastic, said bottom member comprising a flat base and a flat back wall;
a bottom-member rim formed about an opening of said bottom member vessel;
a hollow frustum having a wide-end opening and a narrow-end opening, said frustum permitting free passage therethrough;
a suction member having a first end and a second end, said suction member capable of suctionally engaging a substantially flat non-porous surface of any planar arrangement on said first end, said suction member capable of affixing to said flat back wall of said top member vessel on said second end;
a locking tab capable of engaging a top portion cavity on said top member vessel for affixing said bottom member vessel to said top member vessel, said tab extending upward from the bottom-member rim, said tab protrudes outward forming a side edge wall;
wherein said wide-end opening of said frustum affixingly constructed and centrally arranged on said flat base of said bottom member vessel, said frustum extending from said flat base of said bottom member vessel towards the opening of said bottom member vessel; and
wherein said tab permitting inward depression for releasing said bottom member vessel from said top member vessel.

12. The insect trap according to claim 11 wherein said plastic of said top member vessel is one of opaque plastic, translucent plastic and transparent plastic, and wherein said plastic of said bottom member vessel is one of opaque plastic, translucent plastic and transparent plastic.

13. The insect trap according to claim 11 wherein said hollow frustum is formed from one of opaque plastic, translucent plastic and transparent plastic.

14. The insect trap according to claim 11 wherein said suction member is capable of remaining suctionally engaged to said substantially flat non-porous surface after removal of the bottom member vessel from said top member vessel.

15. The insect trap according to claim 11 wherein said suction member suctionally engages a vertically arranged surface.

16. The insect trap according to claim 11 wherein said hollow frustum having a plurality of holes along a length and about a circumference of said frustum.

17. The insect trap according to claim 11 wherein said top-member rim urgingly slides over and around said bottom-member rim.

18. The insect trap according to claim 16 wherein said plurality of holes are sized to discourage insect passage therethrough.

19. The insect trap according to claim 11 further comprising a ring having a concave top surface and a convex bottom surface, said ring constructed and arranged to frictionally engage against a widening of said hollow frustum from said narrow-end opening toward said wide-end opening, wherein said top surface is constructed and arranged to hold one of a fragrance and an insect poison.

\* \* \* \* \*